United States Patent
Waters et al.

(10) Patent No.: US 8,492,936 B1
(45) Date of Patent: Jul. 23, 2013

(54) HARVESTING ROTATIONAL ENERGY USING LINEAR-BASED ENERGY HARVESTERS

(75) Inventors: Richard L. Waters, San Diego, CA (US); Maxwell M. Kerber, San Diego, CA (US); Brian B. Dick, San Diego, CA (US); Hugo F. Jazo, San Diego, CA (US); Mark S Fralick, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 356 days.

(21) Appl. No.: 13/091,975

(22) Filed: Apr. 21, 2011

(51) Int. Cl.
*H02K 7/06* (2006.01)

(52) U.S. Cl.
USPC .............................................. 310/20; 310/103

(58) Field of Classification Search
USPC ........................... 310/20, 36–37, 103, 156.01
See application file for complete search history.

(56) References Cited

U.S. PATENT DOCUMENTS

| | | | | |
|---|---|---|---|---|
| 3,670,189 A * | 6/1972 | Monroe | ........................... | 310/46 |
| 4,153,851 A * | 5/1979 | Hovorka | ........................... | 310/23 |
| 5,691,587 A * | 11/1997 | Lamb | ........................... | 310/103 |
| 5,739,627 A * | 4/1998 | Lamb | ........................... | 310/75 D |
| 6,072,258 A * | 6/2000 | Lamb | ........................... | 310/191 |
| 6,759,775 B2 * | 7/2004 | Grimm | ........................... | 310/156.23 |
| 7,501,726 B1 * | 3/2009 | Waters et al. | ........................... | 310/36 |
| 7,692,340 B2 * | 4/2010 | Waters et al. | ........................... | 310/36 |
| 7,902,698 B1 * | 3/2011 | Waters | ........................... | 310/36 |
| 7,948,124 B1 * | 5/2011 | Waters et al. | ........................... | 310/36 |
| 2010/0289271 A1 * | 11/2010 | DiMauro et al. | ........................... | 290/1 R |

* cited by examiner

*Primary Examiner* — Thanh Lam
(74) *Attorney, Agent, or Firm* — Kyle Eppele; Peter A. Lipovsky (57) ABSTRACT

A rotational energy harvesting apparatus includes a rotor of magnets and a ring of linear-based kinetic energy harvesters. The rotor of magnets is fixed to a rotational source and is caused to sweep past the linear-based kinetic energy harvesters. The rotating magnets compel kinetic energy to be induced in the linear-based kinetic energy harvesters. The kinetic energy is converted into electrical energy.

18 Claims, 10 Drawing Sheets

HARVESTING ROTATIONAL ENERGY USING LINEAR-BASED ENERGY HARVESTERS

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Please reference Navy Case No. 100910.

INCORPORATION BY REFERENCE

The following document is hereby incorporated by reference herein in its entirety: U.S. Pat. No. 7,501,726.

BACKGROUND

Many applications for energy harvesting involve sources that are rotational, such as those involving wind, fluid flow, or machinery. It is desirable to be able to convert such available rotational energy into electric energy in an efficient manner.

SUMMARY

A rotational-energy harvesting apparatus includes a rotor of magnets and a ring of linear-based kinetic energy harvesters. The rotor of magnets is fixed to a, rotational source and is caused to sweep past the linear-based kinetic energy harvesters. The rotating magnets compel kinetic energy to be induced in the linear-based kinetic energy harvesters. The kinetic energy is converted into electrical energy.

DETAILED DESCRIPTION

Many applications for energy harvesting involve sources that are rotational, such as those involving wind, fluid flow, or machinery. In many instances it is desirable to convert such available rotational energy into electric energy and in such instances to do so as efficiently as possible.

Conventional techniques of generating electrical power from wind typically have total system efficiencies of 20 percent or less. These techniques employ standard electro-inductive generator designs that use individual magnet/coil flux capture.

The United States Navy has developed a novel electromagnetic generator (U.S. Pat. No. 7,501,726 incorporated by reference herein) that promotes a high flux gradient passing through a coil in response to mechanical motion. The linear-based kinetic energy harvesters function by uniform movement of duel magnets with respect to a coil such that, as per Faraday's Law, a changing magnetic flux density is generated in the coil.

Linear-based energy harvesters of this configuration are applied herein to a rotational energy harvesting design, wherein a ring of harvesters are excited by magnets rotated with respect to the harvesters. This rotational harvesting apparatus has the potential to extract energy more efficiently from rotational sources than as per commonly used techniques.

Figure 1:
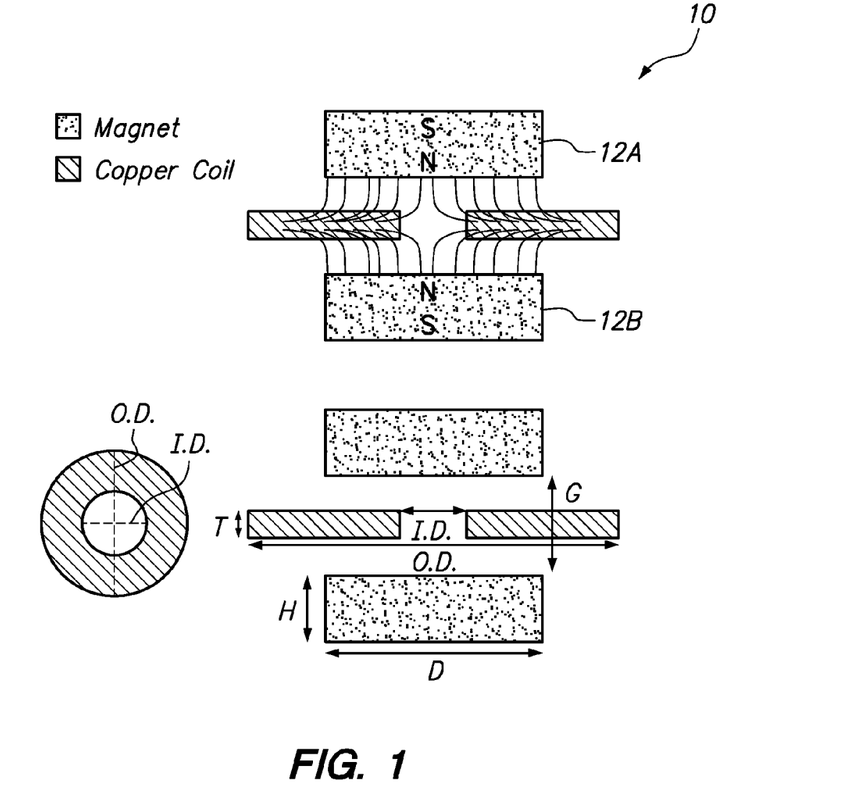
FIG. 1 shows partial side and top cross-sectioned views of a linear-based kinetic energy harvester, such as disclosed in U.S. Pat. No. 7,501,726.

FIG. 1 shows partial side/cross-section views of the linear-based energy harvesters described in U.S. Pat. No. 7,501,726, Harvester 10 is designed so that the magnetic gradient is increased by condensing magnetic flux between two like-poled magnets 12A and 12B, as shown. Magnets 12A and 12B are free to move, via springs/compliant members not shown, relative to coil 14 disposed within the magnetic flux gap between the magnets.

United States Navy efforts have strived to optimize this design. The result is that the dual magnet/coil configuration has measured power outputs that exceed those of the single magnet/single coil configurations.

Figure 2:
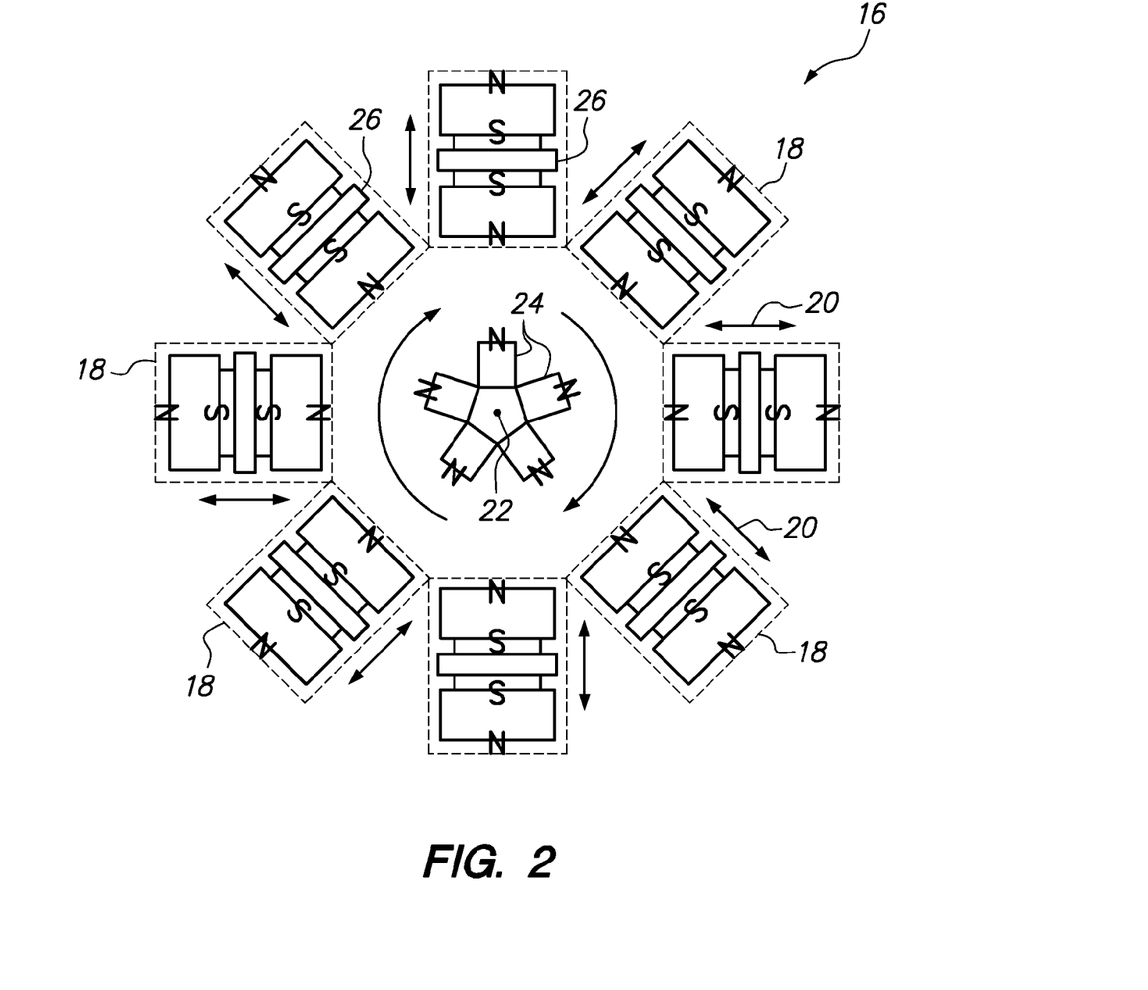
FIG. 2 depicts an exemplary rotational energy harvesting apparatus including a ring of eight linear-based kinetic energy harvesters surrounding a rotor of five exciter magnets.

Referring now to FIG. 2, a rotational-energy harvesting apparatus 16 is shown. Apparatus 16 is an application of utilizing linear-based energy harvesters, such as those of the referenced patent. Applying these linear-based energy harvesters to capture rotational energy, a number of individual single axis harvesters 18 are arranged in a ring, as shown in FIG. 2. Harvesters 18 are arranged such that their linear motion 20 is radial with respect to the ring that they constitute. Harvesters 18 form a ring that shares a common plane and a common axis 22 with a rotatable rotor of exciter magnets 24. As can be seen in the figure, the magnetic poles of exciter magnets 24 and the magnets of harvesters 18 closest to exciter magnets 24 are of opposing magnetic fields, wherein the opposing fields of these two magnetic structures cause the two structures to repel each other. The opposing fields in the instance shown (North) can just as easily be opposite opposing fields (South) as well.

Each individual harvester 18 has a resonant frequency based on the mass of its magnets and the spring constant associated with the spring/compliant members that allow the magnets to move with respect to inner coils 26. Rotation testing with the multiple linear-based harvesters 18 included springs designed to be as similar as possible, within manufacturing error, such that the resonances of the springs matched to within a few Hertz.

As an experiment set-up, a platform was constructed with slots for up to 8 linear-based harvesters, and up to 5 rotatable exciter magnets. The spacing between the linear-based harvesters and the exciter magnets could be adjusted. In the experiment, the rotor of exciter magnets could be driven via a belt and motor or wind turbine. An optical sensor was used to track the exciter magnet rotation frequency.

For comparison purposes, a combination wind turbine/electrical generator was purchased from Four Seasons Windpower, LLC of 3957 Barrington Drive, Medina, Ohio 44256. This turbine/generator combination is known as the Four Seasons Mini Vertical Axis Wind Turbine. The idea was to assess the power output of the wind turbine based upon its turbine and accompanying electrical generator and to compare that to use of the turbine with the rotational energy harvesting apparatus of the invention. A fan was placed 9 inches from the turbine to drive it in both cases. The same drive belt was used whether from the turbine to its accompanying generator or from the turbine to the rotational energy harvesting apparatus.

For rectification of the harvester apparatus AC output, Germanium diodes (0.2-0.3 forward Voltage) were implemented in full wave rectifiers. A three-phase rectifier was used for the Four Seasons generator. In all measurements, power was measured across an ideal load.

Depending on the number of exciter magnets and the arrangement of linear-based harvesters, varying amounts of torque could be expected due to the opposing magnetic fields the exciter magnets and harvesters. It is desired to minimize these torques in order to lessen starting inertia and rotation resistance. If the exciter magnets are symmetric with the harvesters (i.e. both are equal in number) or if the exciter magnets are a multiple of the harvesters (i.e. three and six, for example), it is expected that there will be more torque to overcome due to the creation of deeper potential wells (as seen by the exciter magnets.) However, an even/odd arrangement of linear-based harvesters to exciter magnets would decrease maximum torque by spreading out rather than concentrating the potential wells.

Figure 3:
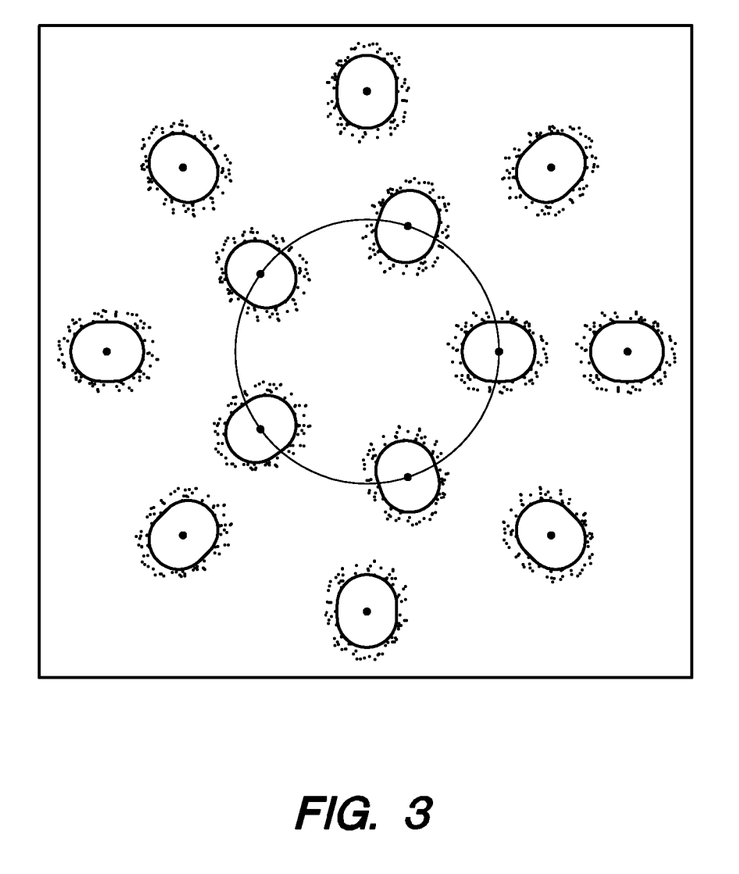
FIG. 3 depicts an electromagnetic simulation of the example rotational-energy harvesting apparatus of FIG. 2.

Mathematica (TRADEMARK), available from Wolfram Research of Champaign, Ill., was used to model maximum torque and magnetic field due to different configurations of exciter magnets and harvesters. For simplification, the magnets were assumed to be fixed, and torque calculated for a fixed spacing of outer and inner magnets. FIG. 3 provides a simulated output for the even/odd (8-outer versus 5-inner) harvester to exciter magnet arrangement.

Figure 4:
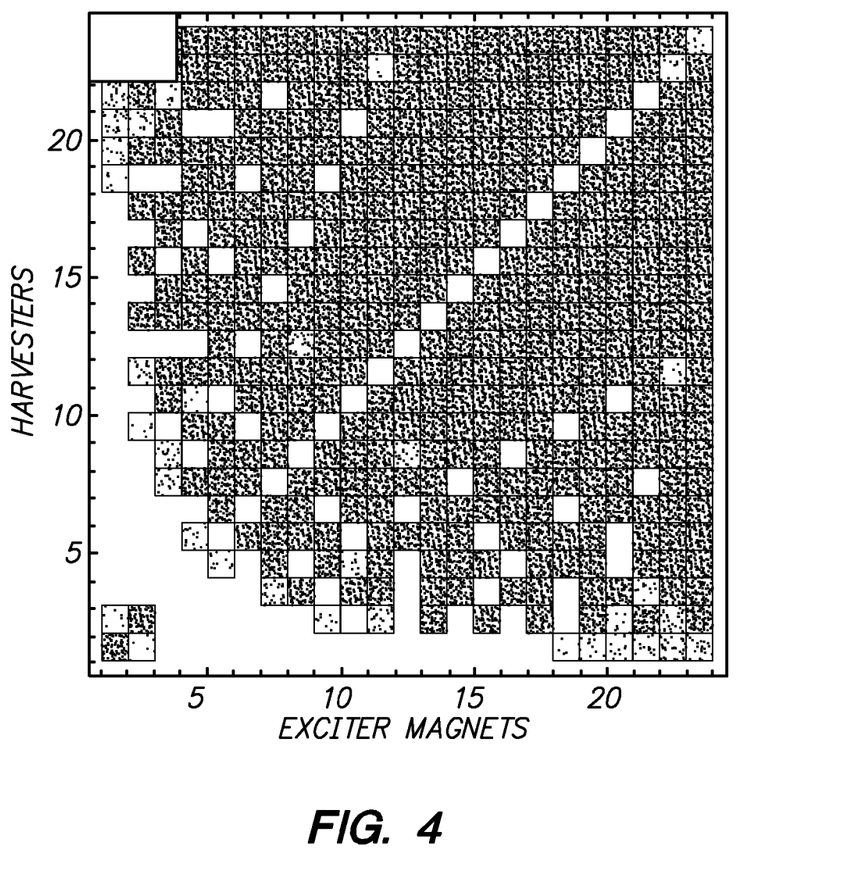
FIG. 4 illustrates torque as a function of the number of linear-based energy harvesters versus magnets.

Referring now to FIG. 4, a calculation of system torque is shown based upon the number of linear-based harvesters (vertical axis) versus the number of exciter magnets (horizontal axis.) One configuration of low maximum torque revealed is 8 linear-based harvesters and 5 exciter magnets. This 8-5 ratio configuration was tested and compared with 8 linear-based harvesters in conjunction with 4 exciter magnets. The latter configuration showed a relatively higher maximum torque when compared to the 8-5 ratio configuration.

During the course of experimentation, measurement and analysis was performed testing two different linear-based energy harvesters. The first (Type A), has a coil with 8,625 turns and resonance of about 18 Hz. The second (Type B), has a coil with 21,150 turns and resonance of about 35 Hz. Both harvester designs have the same magnet to coil spacing.

Figure 5:
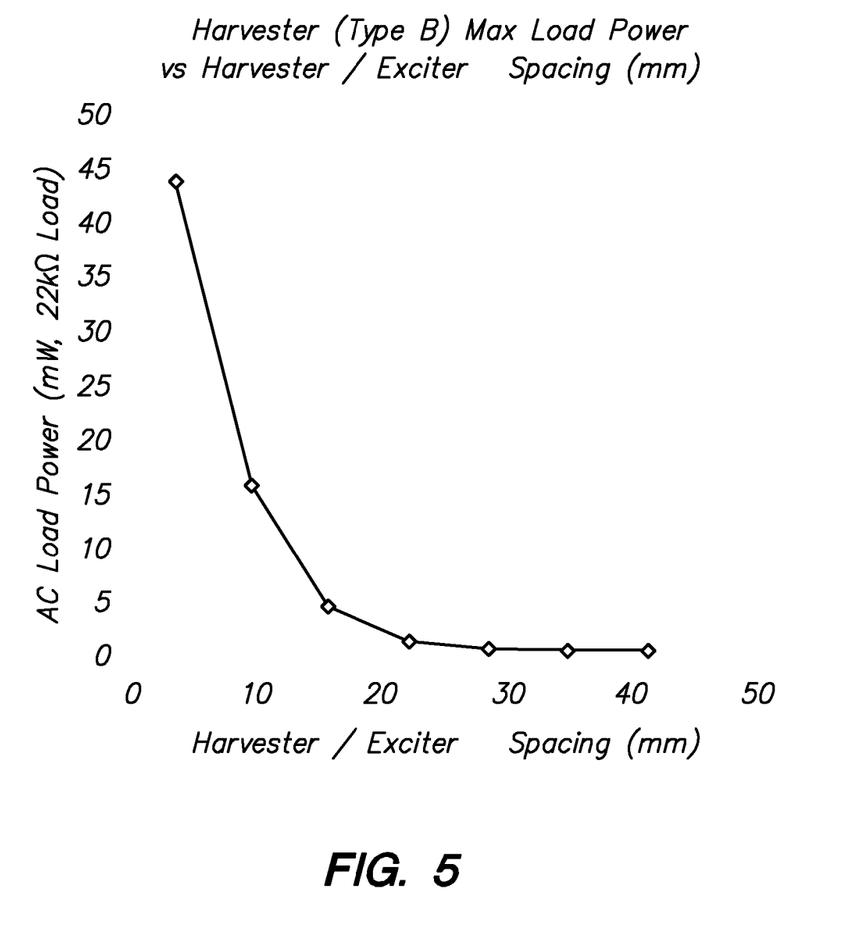
FIG. 5 shows power versus harvester-magnet spacing.

It was found that for higher excitation forces, the magnets of the harvesters would begin to hit their accompanying coil as they vibrate. As the distance between the exciter magnets and the harvesters was decreased, higher input forces were generated on the harvesters. The closer spacing results in an exponentially increasing excitation force. The Type B harvester was designed with stiffer springs and as a result could be placed closer to the exciter magnets before exciter magnet rotation caused the harvester magnets to hit their corresponding coil. The closest spacing tested for Type B (3.2 mm) produced a maximum power delivered to the load of 43.7 mW (see FIG. 5).

Harvester output was also measured as a function of frequency. In this case, the frequency referred to is the rate at which exciter magnets pass an individual harvester (a harvester's magnets). Alternatively, the rotation per minutes of the rotating axis can be found by dividing the calculated frequency by the number of exciter magnets employed. The nonlinearity in the harvester springs creates an output that is hysteretic. The spring nonlinearity is attributed to spring stress during manufacture and assembly.

Figure 6:
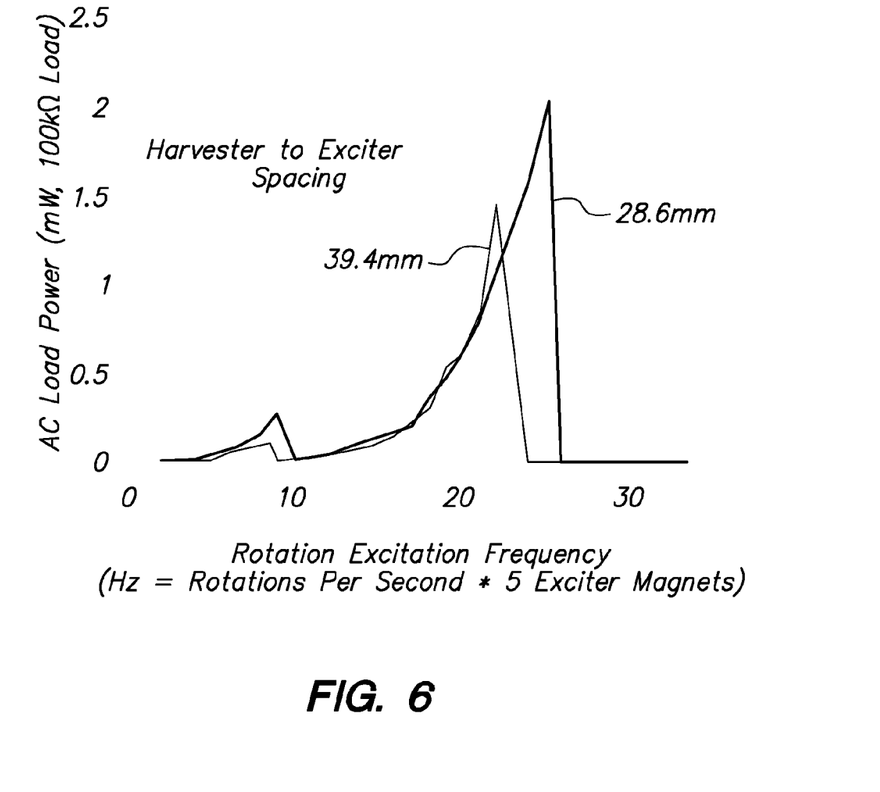
FIG. 6 shows power versus magnet rotation frequency for two example harvester-magnet spacings.

Shown in FIG. 6 is the response due to varying the exciter magnet frequency from low to high with a motor. It can be seen that there are two peaks in the frequency response. The lower peak corresponds to a sub-harmonic of the harvester resonance (at its corresponding effective acceleration). When the exciter magnet passes at a sub-harmonic, it acts as an impulse that causes the harvester to resonate a whole number of cycles. The first sub-harmonic causes two cycles of vibration before the exciter magnet passes again, resulting in resonance at this frequency. The amplitude of the response at the sub-harmonic depends on the mechanical damping of the linear-based harvester.

Plotted are the responses at two different separations of exciter magnets from the linear-based harvester. This separation is approximately where the linear-based harvester magnet begins to hit the harvester's coil at resonance. Smatter separation (and higher power) is possible, but the response given a particular input would be reduced in efficiency.

Optimally, the linear-based harvester resonance and exciter magnet to harvester spacing should be chosen such that with an expected wind strength (or other source), the system is not often driven beyond resonance where the response is low.

To correlate the rotation excitation to an effective induced acceleration and resulting output power, the Type A harvester was exposed to an induced acceleration via a shaker table. In this configuration, a force of about 150 mg of acceleration (induced at shaker frequency of approximately 26 Hz) resulted in a power output from the linear-based harvester of 2 mW.

For the excitation of more than one linear-based harvester, there are various methods of combining the output powers of individual harvesters. There is no coil center-tap to implement a multi-phase rectifier. Nevertheless, harvesters can be connected with one lead in common, but only if the harvester outputs are in phase. This can only occur if the number of excitation magnets equals the number of harvesters. To ensure full rectification, individual Germanium diode full wave rectifiers were used for each harvester.

Figure 7:
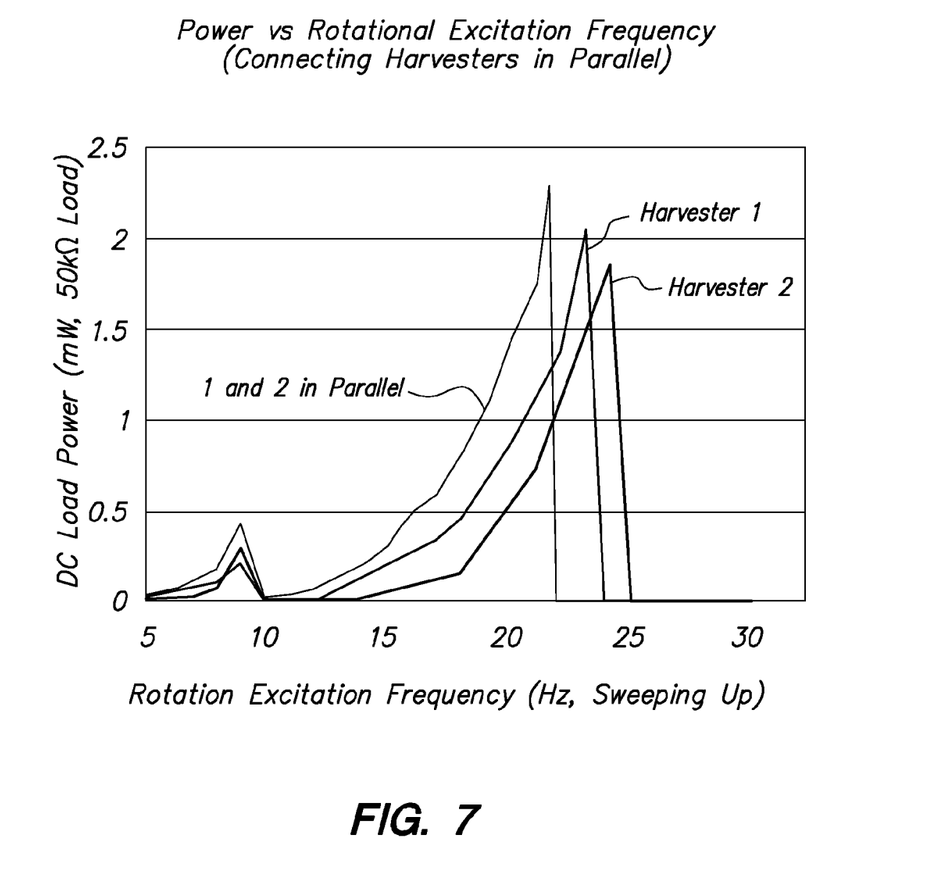
FIG. 7 depicts power derived via parallel harvester connectivity.

The DC outputs of each of the rectifiers can be connected in series or in parallel. If added in series, voltage increases per harvester and the optimum load resistance increases in proportion to the number of outputs. If connected in parallel, the optimum resistance decreases and the overall voltage is the same as a single harvester. Since the U.S. Navy-designed harvesters produce plenty of voltage individually (12 to 14 volts for the configuration of FIG. 6), the outputs were added in parallel. This has the added benefit of reducing the optimum load resistance, which is ideal for situations such as the charging of a capacitor for energy storage. As can be seen in FIG. 7, the output powers roughly add with harvesters in parallel, although combined resonance occurs at a lower frequency.

Experimentation was next conducted with a wind source. With eight harvesters (Type A) connected in parallel, the power delivered to an optimum load was measured for different separations between rotating exciter magnets and harvesters. In addition, two different configurations of the number of rotating exciter magnets (4 and 5) were compared.

Figure 8:
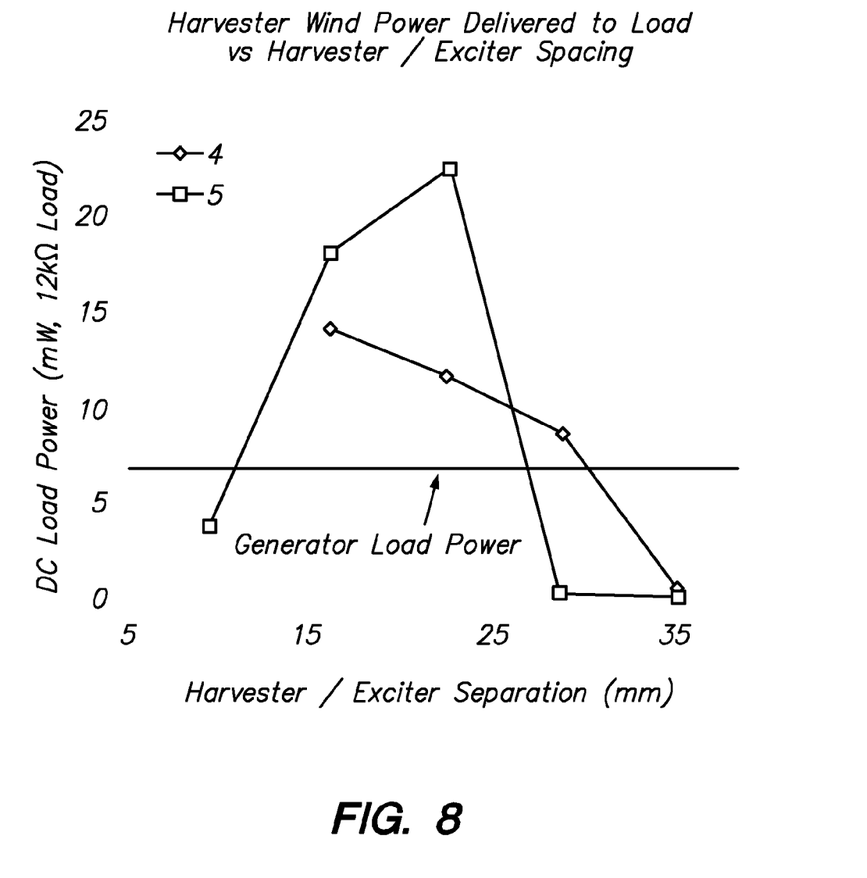
FIG. 8 compares harvesting apparatuses' outputs to that of a conventional wind-power generator.

As can be seen from FIG. 8, the resulting power out is very different for the two different exciter magnet configurations and over-all results in a higher output than the commercial generator, shown in FIG. 8 as "Generator Load Power." Overall, the power is higher with 5 exciter magnets, due to less torque. With 4 rotating exciter magnets, the maximum torque is expected to be higher due to the presence of deeper magnetic potential wells occurring when the exciter magnets exactly line up between harvesters. Under the influence of the wind source, the exciter magnets would not rotate freely for the closest exciter magnet to linear-based harvester separation (at 3.2 mm). For the next two closest separations, the rotor of exciter magnets had to be "kick-started" to overcome the potential well before rotating freely on its own. For the 5 exciter magnet configuration, the exciter magnets started rotating freely and on their own for all exciter magnet/linear-based harvester separations.

An interesting phenomenon occurred during wind testing at various exciter magnet to linear-based harvester separations. For a wide range of separations, the harvesters would "lock on" to resonance. That is, negative feedback is somehow applied by the influence of the linear-based harvester vibrations themselves on the exciter magnets that regulates the turbine speed, such that it rotates the magnets at the linear-based harvester resonance. One could say that there would be an expectation of different rotation rates for different separations because of the reduction in torque seen by the system for larger spacing. However, for a range of separations, what was witnessed was the turbine speed gradually increases until stabilizing at resonance. This phenomenon occurred between about 15 and 22 mm spacings with the 5 exciter magnet configuration and between 15 and 29 mm spacing with 4 exciter magnets scenario. For practical applications, this is desirable because with the right rotational-energy harvesting design, the rotation at of the turbine will lock on to the system linear-based harvester resonance, where power is highest, regardless of the particular resonant frequencies of individual linear-based harvesters. This will allow quite a bit of flexibility in spring design, while taking advantage of increased power output due to resonance.

As can be seen in the FIG. 8 comparison, the power output of the 4 and 5 exciter magnet configurations exceeded that of the generator load power of the commercial generator until the exciter magnet/linear-based harvester separation became large. The power output of the Four Seasons generator that came with the wind turbine was measured with the same wind source used for the rotation harvester wind testing. In both cases, a fan was placed at a distance of 9 inches from the turbine. The same drive belt used between the turbine and the rotatable exciter magnets was used between the turbine and its commercially supplied generator. This consistency eliminated belt friction difference as a variable. The output of the generator was rectified using the same Germanium diodes used for the rotational-energy harvesting design.

To find the maximum power out, for the fixed wind source, the optimum load resistance for the generator was determined by varying the load resistor at the output of the rectifier until maximum power was observed, allowing the system to stabilize for each measurement point. The highest generator power out, with a 680Ω load, was 6.8 mW, compared to 22.4 mW from the rotational harvesting configuration, corresponding to a factor of 3.3 in performance improvement (FIG. 8).

Figure 9:
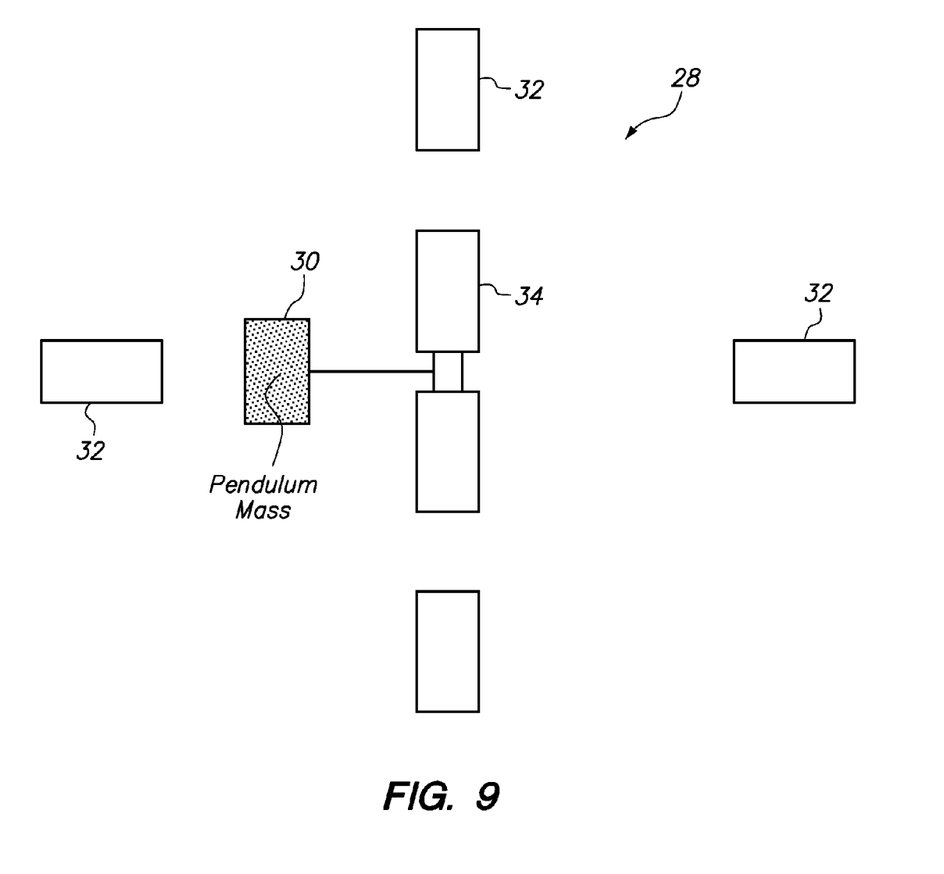
FIG. 9 shows an example alternative embodiment wherein an off-balanced pendulum is employed.

Referring to FIG. 9, an alternative embodiment of a rotational-energy harvesting apparatus 28 is shown where a pendulum mass 30 is placed between the linear-based energy harvesters 32 and exciter magnets 34. Mass 30 is attached to rotate with magnets 34 and is purposely placed to cause a movement (rotation) of magnets 34 based upon movement of apparatus 28, much in the same way that self-winding watches wind upon movement of their users.

Figure 10:
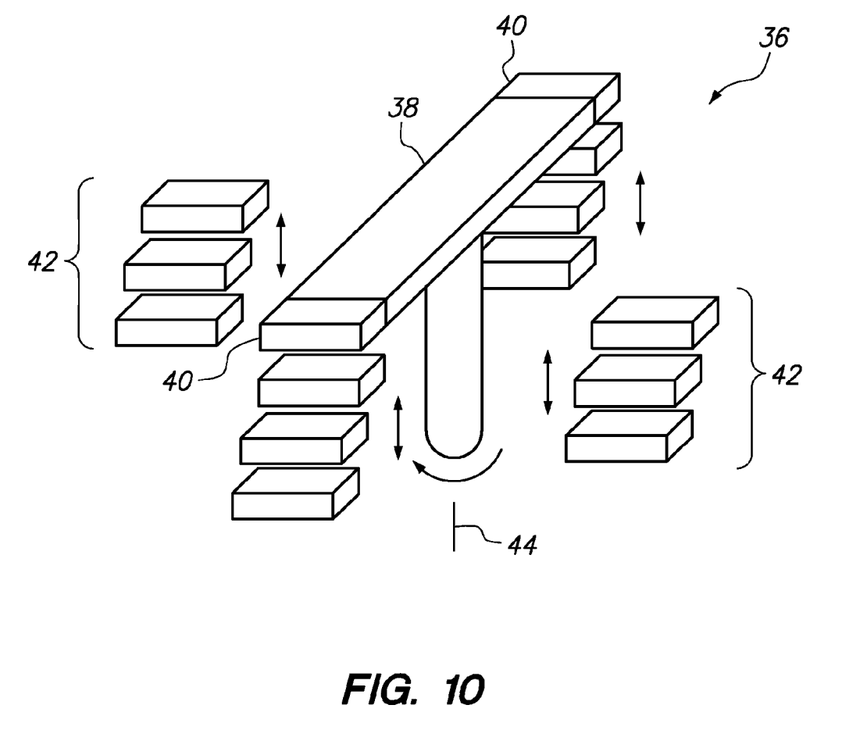
FIG. 10 illustrates an alternative embodiment rotational-energy harvesting apparatus.

Referring now to FIG. 10, an additional alternative rotational-energy harvesting apparatus embodiment 36 is shown. Harvesting apparatus 36 includes a rotor 38 having magnets 40 at diametrically opposing ends of the rotor. Linear-based kinetic energy harvesters 42 (shown largely symbolically) are positioned in a ring such that rotor magnets 40 sweep over the harvesters when the rotor is rotated with respect to the harvesters. As can be seen, linear-based kinetic energy harvesters 42 are disposed for linear-based motion that is directed co-axially with common axis 44.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A rotational energy harvesting apparatus comprising:
   a rotor of magnets; and
   a ring of linear-based kinetic energy harvesters,
   said rotor and ring arranged on a common axis such that rotation of said rotor of magnets with respect to said ring of linear-based kinetic energy harvesters induces kinetic energy in said linear-based kinetic energy harvesters.

2. The apparatus of claim 1 wherein said linear-based kinetic energy harvesters include magnets oriented to repel magnets of said rotor of magnets.

3. The apparatus of claim 1 wherein said linear-based kinetic energy harvesters are disposed for linear-based motion directed radially with respect to said common axis.

4. The apparatus of claim 1 wherein said linear-based kinetic energy harvesters are disposed for linear-based motion directed co-axially with respect to said common axis.

5. The apparatus of claim 1 wherein the ratio of magnets in said rotor of magnets to said linear-based kinetic energy harvesters is other than one.

6. The apparatus of claim 3 wherein said ratio is five to eight.

7. The apparatus of claim 4 wherein electrical outputs of said kinetic-energy harvesters are added in parallel.

8. A rotational-energy harvesting apparatus comprising:
   a rotor of magnets; and
   a ring of linear-based kinetic energy harvesters,
   said rotor and ring arranged along a common axis and within a common plane such that rotation of said rotor of magnets with respect to said ring of linear-based kinetic energy harvesters induces kinetic energy in said linear-based kinetic energy harvesters, wherein said linear-based kinetic energy harvesters include magnets oriented to repel magnets of said rotor of magnets.

9. The apparatus of claim 8 wherein said linear-based kinetic energy harvesters are disposed for linear-based motion directed radially with respect to said common axis.

10. The apparatus of claim 8 wherein the ratio of magnets in said ring of magnets to said linear-based kinetic energy harvesters is other than one.

11. The apparatus of claim 10 wherein said ratio is five to eight.

12. The apparatus of claim 8 wherein electrical outputs of said kinetic-energy harvesters are added in parallel.

13. A rotational-energy harvesting apparatus comprising:
a rotatable inner ring of magnets; and
an outer ring of linear-based kinetic energy harvesters,
said rings arranged along a common axis and within a common plane such that rotation of said rotatable inner ring of magnets induces kinetic energy in said outer ring of linear-based kinetic energy harvesters, wherein said linear-based kinetic energy harvesters include magnets oriented to repel magnets of said rotatable inner ring of magnets.

14. The apparatus of claim 13 wherein said linear-based kinetic energy harvesters are disposed for linear-based motion directed radially with respect to said common axis.

15. The apparatus of claim 14 wherein the ratio of magnets in said rotatable inner ring of magnets to said linear-based kinetic energy harvesters is odd/even.

16. The apparatus of claim 15 wherein said ratio is five to eight.

17. The apparatus of claim 13 wherein said magnets of said rotatable inner ring of magnets and of said outer ring of linear-based kinetic energy harvesters are ferromagnetic magnets.

18. The apparatus of claim 13 wherein said rotatable inner ring of magnets further comprises an attached unbalanced pendulum mass.

* * * * *